United States Patent
Roy (10) Patent No.: US 6,546,660 B2
(45) Date of Patent: Apr. 15, 2003

(54) PICTURE FRAME JOINT AND METHOD OF ASSEMBLING SAME

(75) Inventor: Armand E Roy, Attleboro, MA (US)

(73) Assignee: Craft, Inc., Attleboro, MA (US)

( * ) Notice: Subject to any disclaimer, the term of this patent is extended or adjusted under 35 U.S.C. 154(b) by 0 days.

(21) Appl. No.: 10/054,050

(22) Filed: Jan. 22, 2002

(65) Prior Publication Data

US 2003/0046848 A1 Mar. 13, 2003

Related U.S. Application Data

(60) Provisional application No. 60/318,583, filed on Sep. 11, 2001.

(51) Int. Cl.[7] .............................................. A47G 1/10
(52) U.S. Cl. ..................................................... 40/782
(58) Field of Search ........................ 40/782, 783, 784, 40/785; 403/401, 402, 409.1

(56) References Cited

U.S. PATENT DOCUMENTS

| | | | | |
|---|---|---|---|---|
| 3,899,858 A | * | 8/1975 | Zanker ........................ 403/401 |
| 4,296,587 A | * | 10/1981 | Berdan ........................ 403/298 |
| 4,348,127 A | | 9/1982 | Hays, Jr. ........................ 403/9 |
| 4,403,434 A | | 9/1983 | Jenkins ........................ 40/152 |
| 4,531,315 A | | 7/1985 | Sobel .......................... 40/155 |
| 4,547,986 A | | 10/1985 | Sherman ....................... 40/155 |
| 4,862,612 A | * | 9/1989 | Sugihara et al. ............... 40/782 |
| 4,892,435 A | * | 1/1990 | Anderson .................... 244/123 |
| 4,974,352 A | * | 12/1990 | Shwu-Jen ..................... 40/783 |
| 4,993,866 A | | 2/1991 | Sugihara et al. ............ 403/402 |
| 5,419,064 A | * | 5/1995 | Bennett ........................ 40/782 |

\* cited by examiner

Primary Examiner—Gary Hoge
(74) Attorney, Agent, or Firm—Barlow, Josephs & Holmes, Ltd.

(57) ABSTRACT

A structural joint for connecting picture frames members together includes a base plate slidably residing in a channel of a first picture frame member and includes a ramped surface. A wedge plate slidably resides between the base plate and a top bearing surface of the frame and includes its own ramped surface where the ramped surface of the wedge plate is arranged in an opposite direction to the ramped surface of the base plate. The wedge plate is moved toward the base plate to cause the ramp of the base plate to bear on the ramp of the wedge plate to urge the base plate apart from the wedge plate creating a friction fit within the channel of the picture frame member thus securing the base plate relative to the frame. A second wedge plate is also provided for engagement with a second ramp on the base plate to further secure a second picture frame member to the first picture frame member, such as at a ninety degree angle relative thereto.

31 Claims, 6 Drawing Sheets

ent invention is well-suited for connection of picture frame members together that are of the channel type which are either extruded, machined or molded with an elongated channel running longitudinally therethrough.

PICTURE FRAME JOINT AND METHOD OF ASSEMBLING SAME

This application claims the benefit of U.S. Provisional Patent Application Ser. No. 60/318,583, filed Sep. 11, 2001.

BACKGROUND OF THE INVENTION

The present invention relates generally to hardware use for picture frames. More specifically, the present invention relates to the hardware used to connect various picture frame components together, such as "channel" or "profile" picture frame components.

In the industry, these known picture frame components are typically manufactured of aluminum but may be of other materials, such as molded plastic. Typically, these frames include a total of four members with ends mitered at 45 degrees so that they may neatly mate with one another to form the frame. There is a need in the art to secure the mitered ends together to maintain the frame in its desired shape.

Also in the industry, wood frames are also employed. These frames must be nailed, glued or stapled together. However, with metal frames, such as the above "channel" frames made of aluminum with a channel therein, some type of joint connector must be employed to secured the ends to each other. Known picture frame joints in the prior art typically include an L-shaped plate with two short threaded fasteners through female threaded apertures on each of the two legs of the L-shaped plate. The bottom of the screw members communicate with a thrust plate which is, essentially, the same size and dimension of the main plate but does not have any threaded apertures. These two members are mated together and inserted into the frame to form a "set screw" configuration. As the screws are threaded through the female apertures, the bottom of the screws emanate further below the main member to cause the main member and the thrust plate to be urged further away from each other. Since these two members are residing within a channel in the aluminum frame, the joint is secured therein in clamping fashion. Of course, a second frame member is provided 90 degrees to the one provided to, in turn, form the desired square or rectangular configuration. This prior art construction requires the formation of the threaded bores as well as the tapping of the screws for shipping. However, it is common for these screw members to back out of their respective bores during transit requiring replacement and further handling for installation.

In view of the foregoing, there is a demand for a picture frame joint to be very easy and inexpensive to mass produce. There is a further need for a picture frame joint to be simple and easy to install and remove. There is a demand for a picture frame joint that has few parts that cannot be lost during transit of the picture frame when in an assembled or partially assembled form. There is also a demand for a picture frame joint that does not use expensive tapped holes or other threaded parts.

SUMMARY OF THE INVENTION

The present invention preserves the advantages of prior art picture frame joints and related hardware. In addition, it provides new advantages not found in currently available joint constructions and overcomes many disadvantages of such currently available devices and assemblies.

The invention is generally directed to a novel structural joint that has particular application in the connection of picture frame members together. More specifically, the present invention is well-suited for connection of picture frame members together that are of the channel type which are either extruded, machined or molded with an elongated channel running longitudinally therethrough.

The picture frame joint of the present invention includes a base plate slidably residing in a channel of a first picture frame member and includes a ramped surface. A wedge plate slidably resides between the base plate and a top bearing surface of the frame and includes its own ramped surface where the ramped surface of the wedge plate is arranged in an opposite direction to the ramped surface of the base plate. The wedge plate is moved toward the base plate to cause the ramp of the base plate to bear on the ramp of the wedge plate to urge the base plate apart from the wedge plate creating a friction fit within the channel of the picture frame member thus securing the base plate relative to the frame. A second wedge plate is also provided for engagement with a second ramp on the base plate to further secure a second picture frame member to the first picture frame member, such as at a ninety degree angle relative thereto.

It is therefore an object of the present invention to provide a picture frame joint that replaces the well known picture frame joint of the "set screw" type. A further object of the present invention is to provide a picture frame joint that is inexpensive and easy to manufacture in high volume. Another object of the invention is to provide a picture frame joint construction that does not use expensive tapped holes and threaded set screws. A further object of the present invention is to provide a picture frame joint that is not susceptible to lost parts during transit of the frame when in an assembled or partially assembled form. Yet another object of the present invention is to provide a picture frame joint that requires less handling to reduce the labor associated with installing picture frames joints and assembling picture frames.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
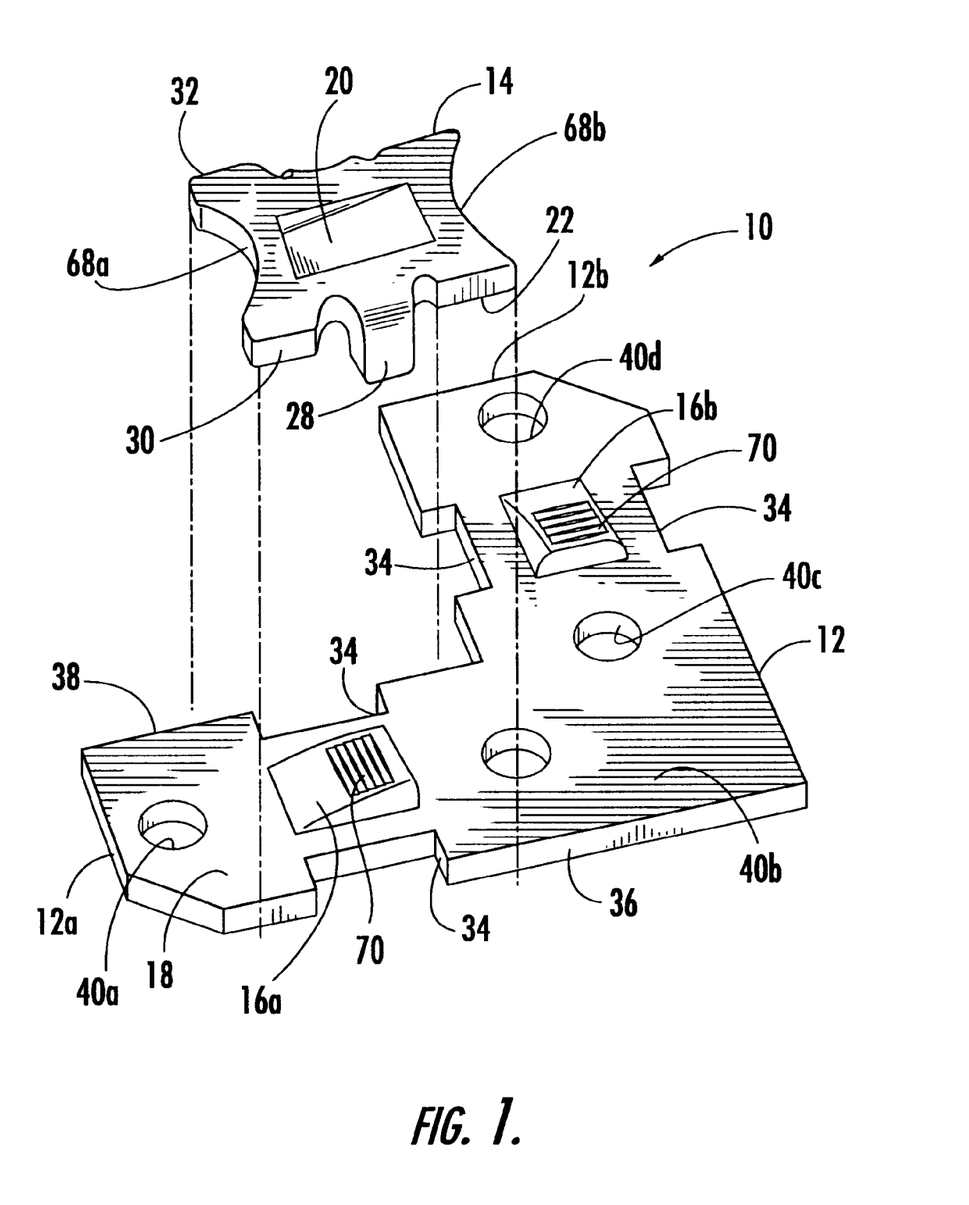
FIG. 1 is a top exploded perspective view of the picture frame joint of the present invention.
Figure 2:
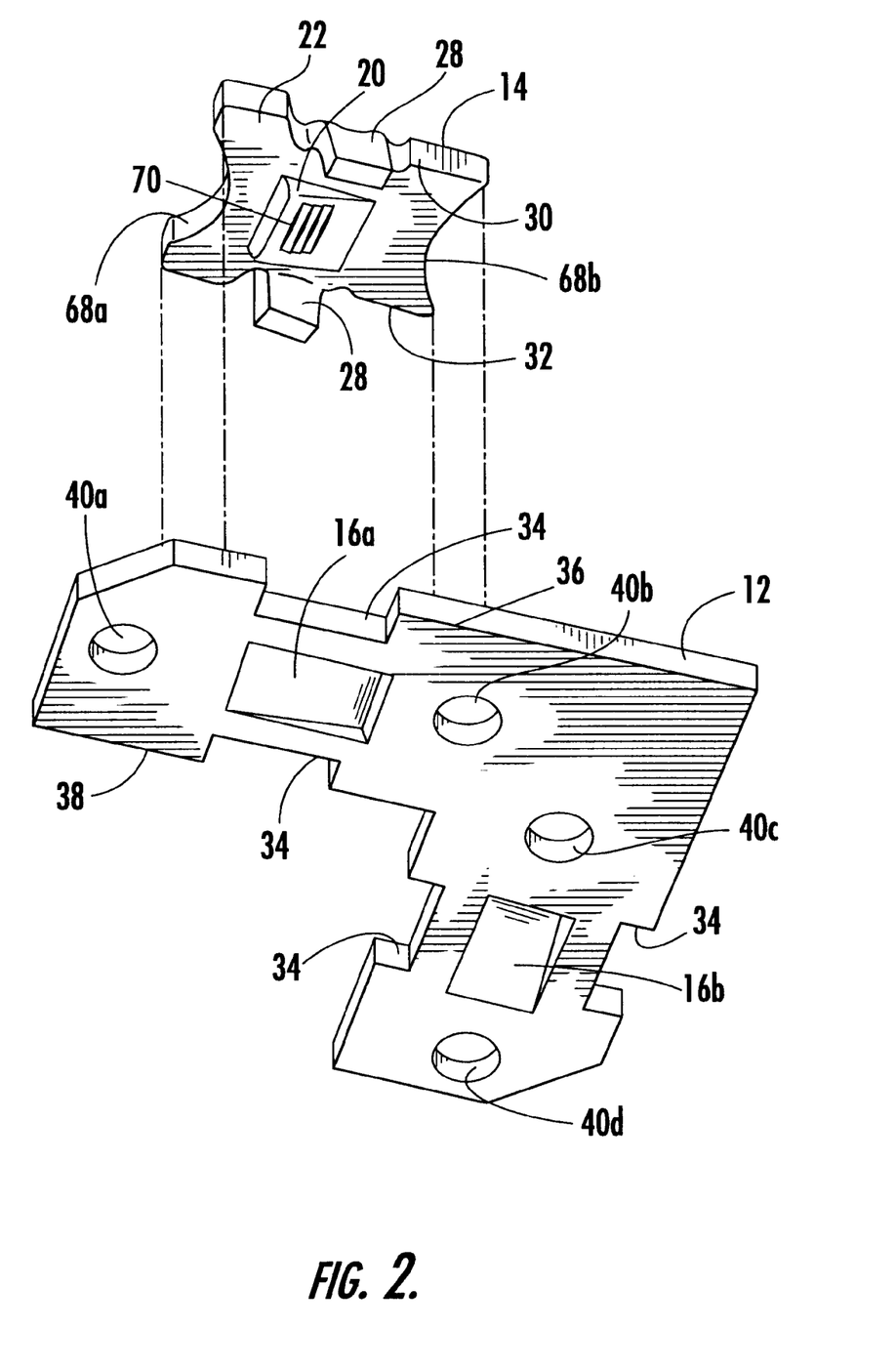
FIG. 2 is a bottom exploded perspective view of the picture frame joint of FIG. 1.

Referring first to FIGS. 1 and 2, top and bottom perspective views of the picture frame joint 10 of the present invention is shown to include a base plate 12 and a wedge plate 14 slidably connected thereto. The base plate 12 includes base ramps 16a and 16b emanating upwardly from the top surface 18 of the base plate 12 where base ramps 16a and 16b decrease in height running toward the free ends 12a and 12b of the base plate 12 as shown in FIGS. 1 and 2. The wedge plate 14 includes a wedge ramp 20 on its bottom surface 22 that increases in height running from right to left as shown in FIG. 2. The wedge ramp 20 is positioned to run in an direction opposite to the direction of base ramp 16a on the top surface 18 of the base plate 12. As will be discussed in detail below, the wedge ramp 20 and the base ramps 16a and 16b engage in complementary fashion to secure members 24 and 26, as in FIGS. 4 and 7, of a picture frame assembly together.

To connect two picture frame parts 24 and 26 together, a single picture frame joint 10 of the present invention is employed. For example, it is desirable to connect two picture frame members 24 and 26 together at a ninety degree angle relative to one another to form a corner of a picture frame. The corners are typically mitered at a complementary 45 degree angle to form a neat corner. As shown in the figures, the base plate 12 is preferably formed in an L-shape with two base ramps 16a and 16b provided at opposing ends thereof. In should be understood that a first base ramp 16a engages with one separate wedge ramp 20 to connect the joint to a first picture frame member 24 and a second base ramp 16b on the base plate 12 engages with a second separate wedge ramp (not shown) to connect the joint 10 to a second picture frame member 26 thereby effectively mating the first picture frame member 24 to the second picture frame member 26.

The use of an L-shaped base plate 12 is one of many configurations that can be employed in accordance with the present invention and is preferred because it is well-suited to connect two picture frame members 24 and 26 together at a ninety degree angle relative to one another. In an alternative embodiment, which is not shown, the base plate 12 may be linear in configuration with a pair of base ramps 16a and 16b at opposing ends thereof. For ease and simplicity of illustration and discussion, the connection of the picture frame joint 10 will be described below in detail for the connection of one side of the picture frame joint 10 of the present invention to one channel type picture frame member 24. The connection of a second picture frame member 26 is identical to the connection of the first picture frame member 24 to the first side of the picture frame joint 10.

Figure 5:
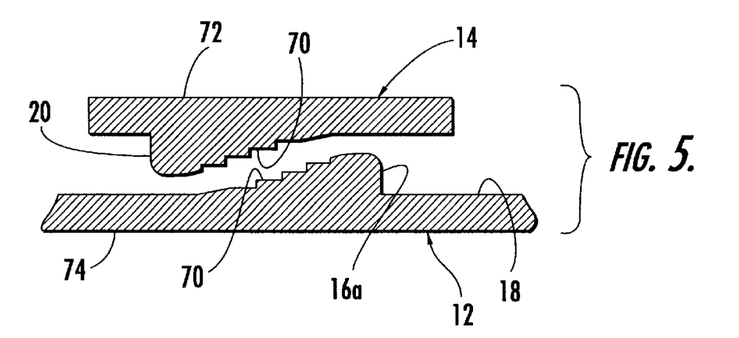
FIG. 5 is a cross sectional view through the line 5—5 of FIG. 4 showing communication of the stepped surface of the base plate with the ramped stepped surface of the wedge member.

As best seen in FIG. 5, the wedge plate 14 is positioned so that the wedge ramp 20 loosely communicates with the corresponding base ramp 16a emanating upwardly from the top surface 18 of the base plate 12. To complete the joint, a second wedge plate (not shown) is also placed above the second base ramp 16b on the base plate 12.

In FIGS. 1 and 2, the wedge plate 14 further includes a pair of guide tabs 28 which emanate downwardly from front edge 30 and rear edge 32. Also, a notches 34 are formed in the front edge 36 and rear edge 38 of the base plate 12. When the wedge plate 14 is placed into communication with the corresponding ramp 16a on the base plate 12 the guide tabs 28 of the wedge plate 14 slidably reside within their corresponding notches 34 in the base plate 12. As a result, sliding travel of the wedge plate 14 along the length of the base plate 12 is limited to the length of the notches 34. As will be explained in detail below, leverage apertures 40a, 40b, 40c and 40d are provided through the base plate 12 on opposing sides of each of the ramps 16a and 16b on the top surface 18 of the base plate 12.

Figure 3:
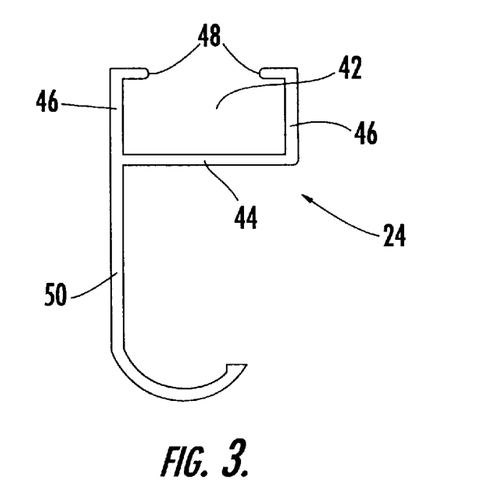
FIG. 3 is an end view of a picture frame member which is partially broken away for illustration purposes.

Turning now to FIG. 3, an end view of a typical picture frame member 24 of the "channel" type is shown to include a longitudinally running channel 42 defined by a floor 44 with opposing upstanding walls 46 with lips 48 extending inwardly from the respective free ends of the upstanding walls 46. Extending downwardly from the floor is an elongated flange member 50 for embracing a picture and other associated materials (not shown), such as glass and cardboard for the construction of an entire picture frame. Further details of the construction of this picture frame member 24 need not be discussed as they are well known in the art.

Figure 4:
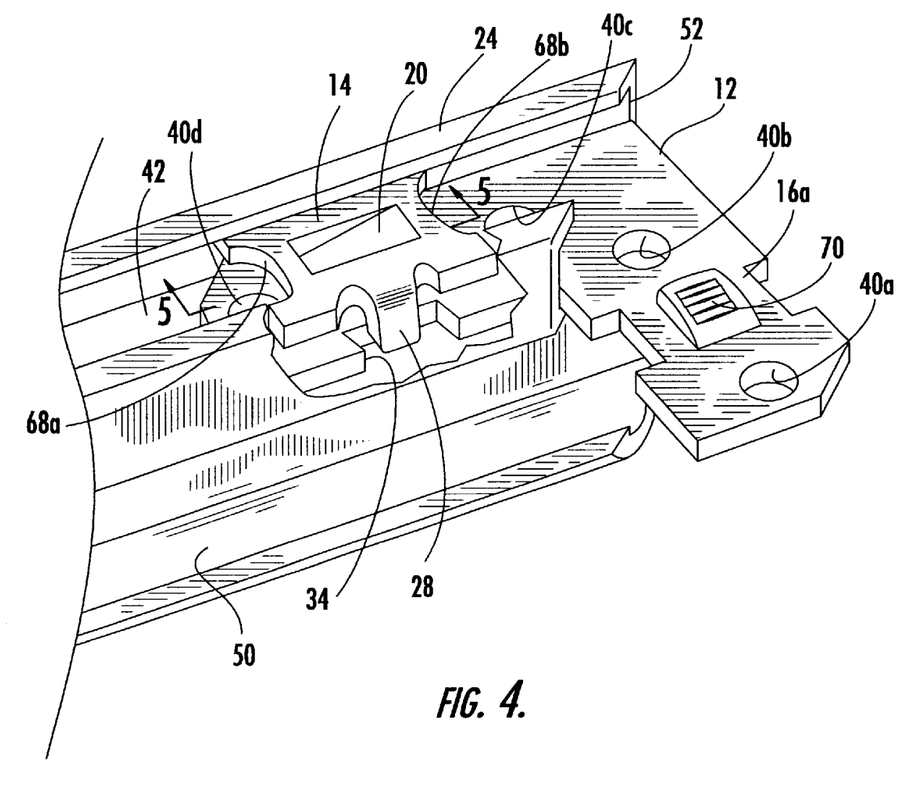
FIG. 4 is a perspective view of the picture frame joint of the present invention installed into the picture frame member of FIG. 3.

In accordance with the present invention, the picture frame joint 10 is employed to connect two picture frame members 24 and 26, such as of the type shown in FIG. 3, together to form a complete picture frame assembly. Referring to FIGS. 4–7 the installation of the picture frame joint 10 of the present invention is installed to a channel type picture frame member 24. First, as shown in FIG. 4, the wedge plate 14 is loosed mated to one leg of the L-shaped base plate 12 so that the guide tabs 28 of the wedge member 14 slidably reside within the notches 34 in the base plate 12. FIG. 5 illustrates the loose communication of the base plate 12 with the wedge plate 14 prior to insertion of one leg of the base plate 12 into the channel 42 of the picture frame member 24.

Figure 8A:
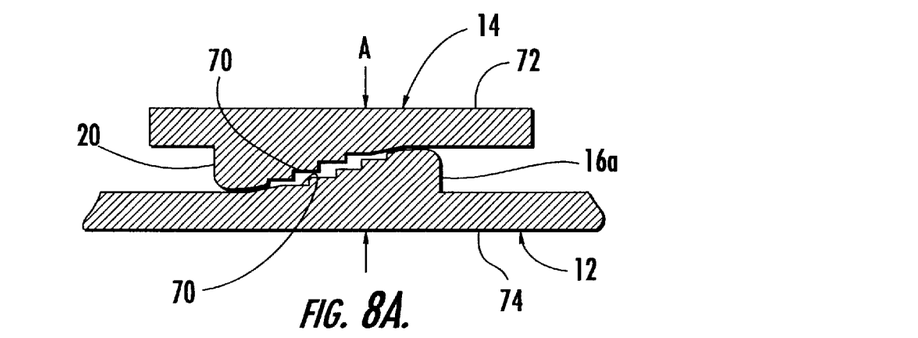
FIG. 8A is a cross-sectional view of the base plate and wedge member when the picture frame joint is in an unlocked condition as shown in FIGS. 4 and 6.

The coupled base plate 12 and wedge plate 14 are then inserted into the channel 42 of the picture frame member 24 via an open free end 52 of the picture frame member 24. In the preferred embodiment, the free end 52 of the picture frame member 24 is mitered at a 45 degree angle which is typical in channel type picture frame assemblies. In the condition show in FIG. 4, the base plate 12 may easily slide within the channel 42 of the picture frame member 24 with wedge plate 12 loosely secured thereto via the guide tabs 28 and notches 34 of the base plate 12. The floor 44 and inwardly turned lips 48 of the picture frame member 24 are a distance apart from one another that is larger than the overall stack height A of the base plate 12 and wedge plate 14 together, as shown in FIG. 8A. However, the distance between the floor 44 and the lips 48 is not large enough to allow for the guide tabs 28 of the wedge plate 14 to ride out of their respective notches 34 to permit free sliding of the wedge member 14 within the channel 42. Therefore, once the wedge plate 14 is mated with the base plate 12 and inserted into the channel 42 of the picture frame member 24, it cannot be separated from the base plate 12 and subsequently lost.

Figure 9:
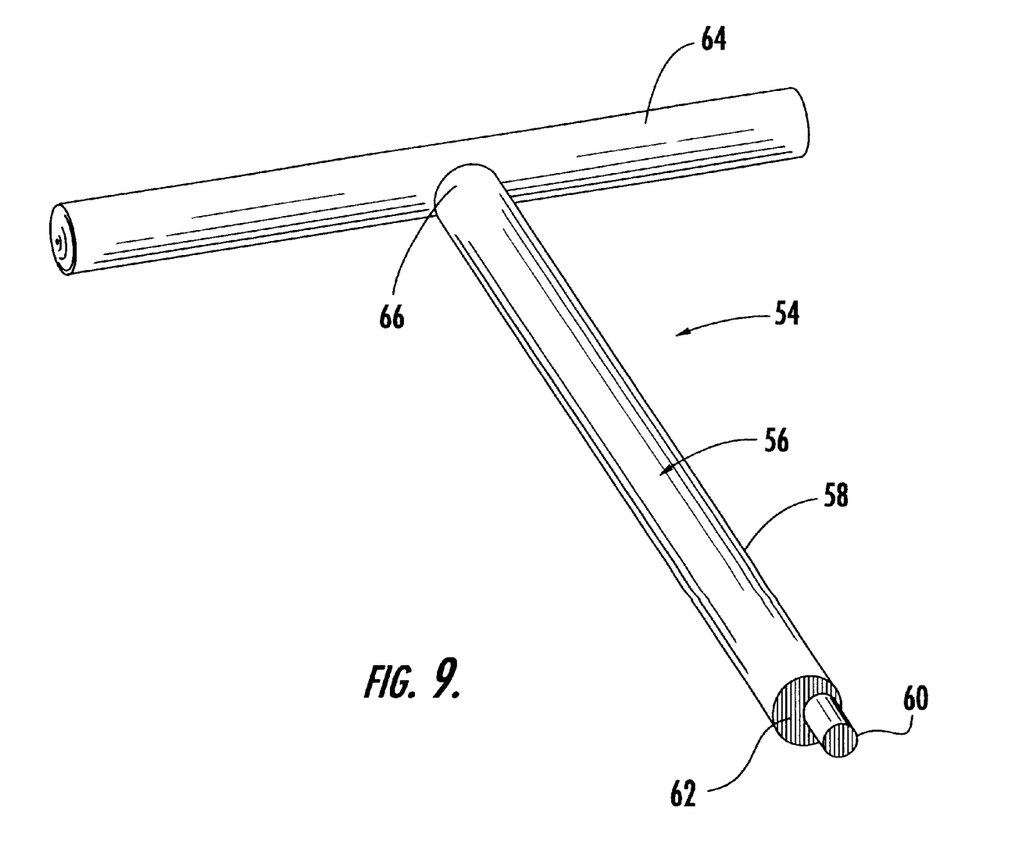
FIG. 9 is a perspective view of the installation tool used in accordance with the present invention.

Once the position of the coupled base plate 12 and wedge plate 14 within the channel 42 are adjusted as desired, they may be secured in place. In accordance with the present invention, the wedge plate 14 is moved so that the ramp 20 of the wedge plate 14 communicates with the ramp 16a of the base plate 12 so to increase the stack height of the base plate 12 and wedge plate 14 to frictionally secure the picture frame joint 10 between the floor 44 and lips 48 of the picture frame member 24. To assist in movement of the wedge plate 14, the tool 54 of FIG. 9 is employed. The tool 54 includes an elongated shaft 56 with an outer wall 58 that serves as a bearing surface. An eccentric pin 60 extends from the bottom free end 62 of the elongated shaft 56. A handle 64 is provided on the top free end 66 to facilitate rotation of the elongated shaft 56.

Figure 6:
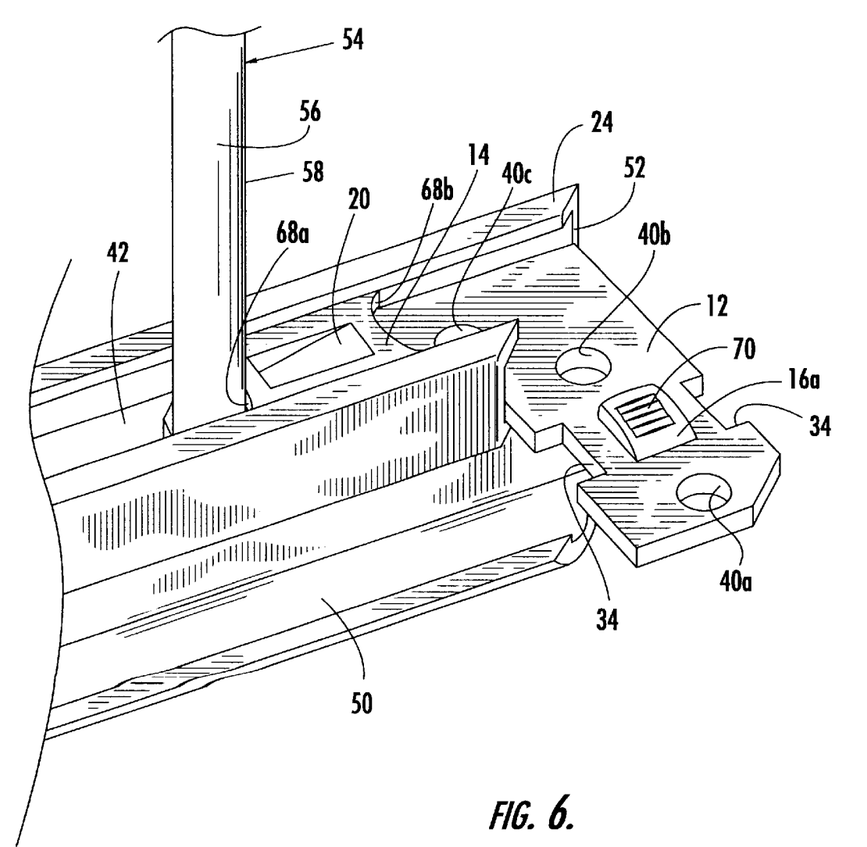
FIG. 6 is a perspective view showing insertion of the installation tool into the base plate for locking of the picture frame joint to the picture frame member.
Figure 7:
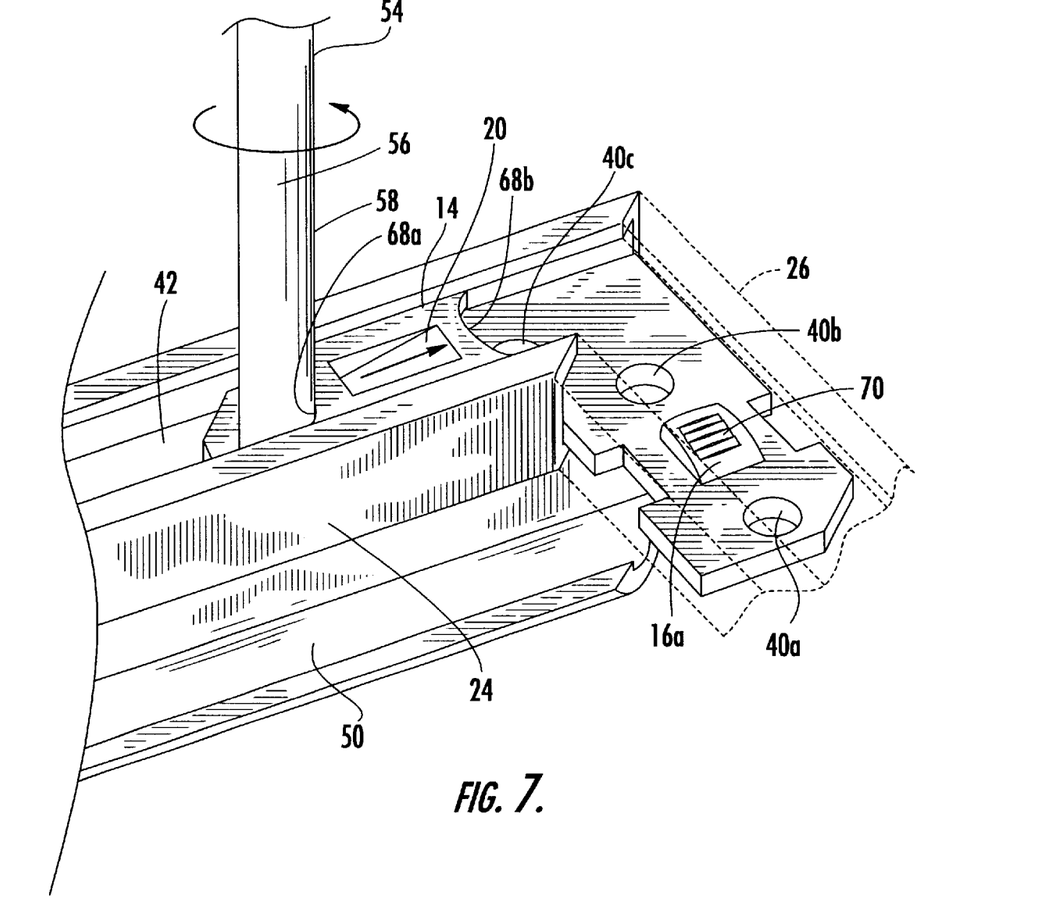
FIG. 7 is a perspective view showing the installation tool in the process of locking the picture frame joint to the picture frame member.
Figure 8B:
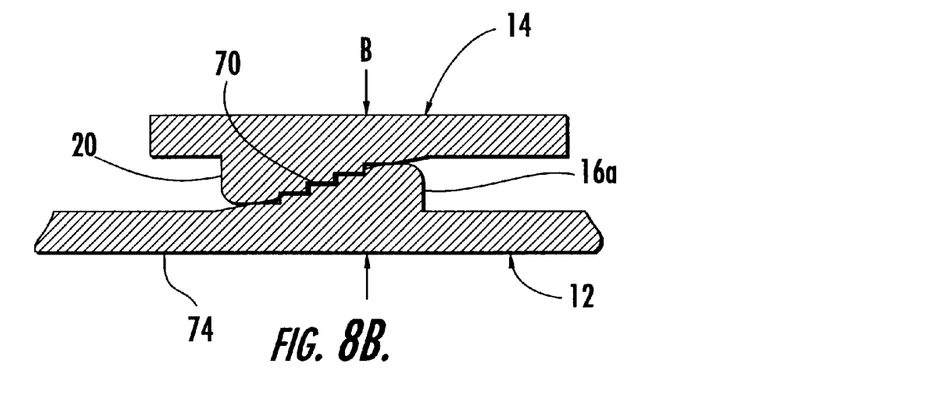
FIG. 8B is a cross-sectional view of the base plate and wedge member when the picture frame joint is in a locked condition as shown in FIG. 7.

Referring to FIG. 6, the pin 60 of the tool 54 is inserted into the aperture 40d that is closest to the wedge plate 14. Due to the eccentricity of the pin 60, the installation tool 54 must be oriented accordingly to allow the pin 60 to be fully inserted into the aperture 40d because the wedge plate and its bearing surface 68a is proximal thereto. As shown In FIG. 7, the tool 54 is rotated about the longitudinal axis through the eccentric pin 60 to cause the outer wall 58 of the elongated shaft 56 to bear onto the bearing surface 68a of the wedge plate 14 to urge it to the right. The movement of the wedge plate 14 to the right causes the ramp 20 of the wedge plate 14 to climb up the ramp 16b of the base plate 12 in ratcheting fashion to provide a greater overall stack height B, as shown in FIG. 8B which is greater that than the stack height A shown in FIG. 8A. Such ratcheting is facilitated by the use of complementary steps 70 on both the ramps 16a and 16b on the base plate 12 and the ramp 20 on the wedge plate 14.

The increase of the stack height from A to B occurs within the confines of the picture frame member 24, namely between its floor 44 and inwardly turned lips 48. Therefore, such increase in stack height causes the top surface 72 of the wedge plate 14 to bear against the lips 48 of the picture frame member 24 and the bottom surface 74 of the base plate 12 against the floor 44 of the picture frame member 24. Essentially, the picture frame joint 10 of the present invention provides a unique expanding internal clamp that is ideally suited for connecting to a channel type picture frame member 24 and securing one picture frame member 24 to another picture frame member 26.

Once the picture frame joint 10 is secured to the picture frame member 24, a second picture frame member 26, shown in broken lines in FIG. 7, may now be connected to the free end of the L-shaped base plate 12 to form the second half of the ninety degree picture frame structure. The second picture frame member 26 also includes a mitered 45 angle free end to mate cleanly with the 45 degree angle free end of the first picture frame member 24. The second picture frame member 26 is secured and locked to the base plate 12 in identical fashion as the first picture frame member 24 by use of a second wedge plate (not shown) to engage with the second ramp 16a on the top surface 18 of the base plate 12. With both sides of the base plate 12 connected to a picture frame member 24 and 26 respectively, the corner of the picture frame structure is fully assembled. A total of four picture frame joints 10 and four picture frame members are employed to construct a completed picture frame assembly.

To unlock the picture frame joint 10 from the picture frame members 24 and 26, the pin 60 of the installation tool 54 is inserted into the aperture 40c which is closest to the wedge plate 14 and, namely, its bearing surface 68b. Since the wedge plate 14 was shifted to the right for locking, the closest aperture is now the aperture 40c immediately to the right of the ramp 16b. The tool 54 is rotated with the pin 60 in the aperture 40c to cause the outer wall 58 of the elongated shaft 56 to bear against the bearing surface 68b on the wedge plate 14 to urge the wedge plate 14 to the left out of frictional engagement with the lips 48 of the picture frame member 24 and into an unlocked condition. When unlocked, the wedge plate 14 still remains loosely mated with the base plate 12 due to the continued positioning of the guide tabs 28 within the notches 34 of the base plate 12, as in FIG. 4. Loss of the wedge plate 14 is thereby avoided during unlocking of the picture frame joint 10. The picture frame members may now be separated to facilitate changing of the picture or glass (not shown) residing therein.

The picture frame joint 10 of the present invention may be manufactured in many different ways and of different materials. Preferably, the picture frame joint 10 is manufactured of steel for ease of manufacture and durability and may be anodized or otherwise chemically treated, if desired. Both the wedge plate 14 and base plate 12 are preferably die cut and stamped out of steel without the need for expensive thread tapping and custom set screws as required in prior art joint connectors for picture frames. Further, the picture frame joint 10 may be molded from other materials, such as plastic, to suit the application at hand.

Moreover, the construction of the picture frame joint itself 10 may be modified and still be within the scope of the present invention. For example, the ramps 16a and 16b on the base plate 12 preferably decrease in height running toward the respective free ends of the base plate 12. However, reversing of the direction of the ramps 16a and 16b, and the positioning of the wedge plates 14 thereon, is contemplated by the invention. While steps 70 are preferred to provide additional friction to the ramp 20 of the wedge plate and the ramps 16a and 16b base plate, other structures may be employed to add such friction. For example, the steps 70 on the surfaces of the ramps 16a, 16b and 20 may be replaced with a roughened surface or grit coating to provided the preferred friction interface. It is also possible that the steps 70 or additional friction structure be eliminated entirely and still be within the scope of the present invention.

The use of a apertures 40a–d and the tool 54 with eccentric pin 60 are preferably employed in accordance with the present invention. However, other structures may be employed as long as they facilitate the engagement and disengagement the wedge plate 14 to and from the base plate.

It would be appreciated by those skilled in the art that various changes and modifications can be made to the illustrated embodiments without departing from the spirit of the present invention. All such modifications and changes are intended to be covered by the appended claims.

What is claimed is:

1. A structural joint, comprising:
    a frame member having a floor and a top bearing surface defining a channel therebetween;
    a base member slidably residing in the channel; the base member having a stepped surface; the stepped surface of the base member having a plurality of first contact surfaces which are substantially parallel to the floor;
    a wedge member having a stepped surface substantially complementary to the stepped surface of the base member; the stepped surface of the wedge member having a plurality of second contact surfaces which are substantially parallel to the floor; the wedge member residing between the stepped surface of the base member and the top bearing surface of the frame;
    whereby sliding of the wedge member toward the stepped surface of the base member, with at least one of the first contact surfaces in communication with at least one of the second contact surfaces, internally clamps the base member to the frame.

2. The structural joint of claim 1, wherein the frame is a picture frame molding.

3. The structural joint of claim 2, wherein the picture frame molding is manufactured of metal.

4. The structural joint of claim 2, wherein the picture frame molding is manufactured of wood.

5. The structural joint of claim 2, wherein the picture frame molding is manufactured of plastic.

6. The structural joint of claim 1, wherein the base member and wedge member are manufactured of metal.

7. The structural joint of claim 1, further comprising:
means for urging the wedge member into communication with the base member.

8. The structural joint of claim 1, further comprising:
means for urging the wedge member out of communication with the base member.

9. The structural joint of claim 1, further comprising:
means for retaining the wedge member in communication with the base member.

10. The structural joint of claim 9, wherein the means for retaining is a pair of downwardly depending tabs extending from opposing sides of the wedge member in slidable communication within a corresponding pair of notches on opposing sides of the base member.

11. The structural joint of claim 1, wherein the base member is L-shaped having a first leg and a second leg with a first ramped surface on the first leg and a second ramped surface on the second leg; the first leg and first ramped surface being capable of communication with a first wedge member for connection to a first frame member and the second leg and second ramped surface being capable of communication with a second wedge member for connection of a second frame member thereby securing the first frame member relative to the second member.

12. A structural joint, comprising:
a frame including a bottom support surface and a top bearing surface and defining a channel therebetween; the frame including a first end and a second end;
a base plate slidably residing in the channel defined by the frame and having a first side proximal to the floor of the frame and a second side facing the bearing surface of the frame; the base plate including a first stepped surface on the second side of the base plate; the first stepped surface having a plurality of first contact surfaces which are substantially parallel to the bottom support surface and increasing in height from the first end of the frame toward the second end of the frame;
a wedge plate slidably residing between the base plate and the top bearing surface of the frame having a first side in communication with the top bearing surface of the frame and a second surface facing the base plate; the wedge plate including a second stepped surface on the second side of the wedge plate; the second stepped surface having a plurality of second contact surfaces which are substantially parallel to the bottom support surface and decreasing in height from the first end of the frame toward the second end of the frame;
whereby sliding of the wedge plate toward the base plate causes at least one of the first contact surfaces of the base plate to communicate with at least one of the second contact surfaces of the wedge plate to urge the base plate apart from the wedge plate creating a friction fit of the base plate and wedge plate between the floor and top bearing surface of the frame thus securing the base plate relative to the frame.

13. The structural joint of claim 12, wherein the frame is manufactured of a material selected from the group consisting of metal, wood and plastic.

14. The structural joint of claim 12, wherein the base plate and wedge plate are manufactured of metal.

15. A method of assembling a structural joint, comprising the steps of:
providing a frame member having a floor and a top bearing surface defining a channel therebetween;
providing a connection member having a first stepped surface with a plurality of first contact surfaces which are substantially parallel to the floor and extending upward in a first direction having a high portion and a low portion;
providing a wedge member having a second surface with a plurality of second contact surfaces which are substantially parallel to the floor and being substantially complementary to the first contact surfaces of the connection member;
mating the wedge member with the connection member with the first stepped surface in communication with the second stepped surface;
inserting the connection member and wedge member into the channel of the frame;
urging the wedge member to further ride at least one of the second contact surfaces up onto at least one of the first contact surfaces of the connection member; and
internally clamping the connection member and wedge member between the floor of the frame and the top bearing surface.

16. The method of claim 15, wherein the step of urging the wedge member further comprises the steps of:
providing an installation aperture in the connection member proximal to the low portion of the first stepped surface;
providing a tool with a tubular barrel having an outer surface and an offset pin on the free end thereof;
inserting the pin of the tool into the installation aperture; and
rotating the barrel of the tool about the offset pin with the outer surface of the tubular barrel urging the wedge member into internal clamped communication with the connection member.

17. The method of claim 15, further comprising the step of:
urging the wedge member away from the connection member for unclamping the connection member and wedge member from the frame.

18. The method of claim 17, wherein the step of urging the wedge member away from the connection member comprises the steps of:
providing an removal aperture in the connection member proximal to the first ramped surface proximal to the high portion of the first stepped surface of the connection member;
providing a tool with a tubular barrel having an outer surface and an offset pin on the free end thereof;
inserting the pin of the tool into the removal aperture; and
rotating the barrel of the tool about the offset pin with the outer surface of the tubular barrel urging the wedge member out of internal clamped communication with the connection member thereby releasing the connection member from the frame member.

19. A structural joint, comprising:
a frame member having a floor and a top bearing surface defining a channel therebetween;
a base member slidably residing in the channel; the base member having a ramped surface;
a wedge member having a ramped surface substantially complementary to the ramped surface of the base member; the wedge member residing between the ramped surface of the base member and the top bearing surface of the frame;

means for retaining the wedge member in communication with the base member; the means for retaining being a pair of downwardly depending tabs extending from opposing sides of the wedge member In slidable communication within a corresponding pair of notches on opposing sides of the base member;

whereby sliding of the wedge member toward the ramped surface of the base member internally clamps the base member to the frame.

20. The structural joint of claim 19, wherein the frame is a picture frame molding.

21. The structural joint of claim 20, wherein the picture frame molding is manufactured of metal.

22. The structural joint of claim 20, wherein the picture frame molding is manufactured of wood.

23. The structural joint of claim 20, wherein the picture frame molding is manufactured of plastic.

24. The structural joint of claim 19, wherein the base member and wedge member are manufactured of metal.

25. The structural joint of claim 19, wherein the ramped surface of the base member and the ramped surface of the wedge member are stepped.

26. The structural joint of claim 19, further comprising:
means for urging the wedge member into communication with the base member.

27. The structural joint of claim 19, further comprising:
means for urging the wedge member out of communication with the base member.

28. The structural joint of claim 19, wherein the base member is L-shaped having a first leg and a second leg with a first ramped surface on the first leg and a second ramped surface on the second leg; the first leg and first ramped surface being capable of communication with a first wedge member for connection to a first frame member and the second leg and second ramped surface being capable of communication with a second wedge member for connection of a second frame member thereby securing the first frame member relative to the second member.

29. A method of assembling a structural joint, comprising the steps of:

providing a frame member having a floor and a top bearing surface defining a channel therebetween;

providing a connection member having a first ramped surface extending upward in a first direction having a high portion and a low portion;

providing a wedge member having a second ramped surface substantially complementary to the ramped surface of the connection member;

mating the wedge member with the communication member with the first ramped surface in communication with the second ramped surface;

inserting the connection member and wedge member into the channel of the frame;

urging the wedge member to further ride the second ramped surface up onto the first ramped surface of the connection member;

providing an installation aperture in the connection member proximal to the low portion of the first ramped surface:

providing a tool with a tubular barrel having an outer surface and an offset pin on the free end thereof;

inserting the pin of the tool into the installation aperture; and rotating the barrel of the tool about the offset pin with the outer surface of the tubular barrel urging the wedge member into internal clamped communication with the connection member; and internally clamping the connection member and wedge member between the floor of the frame and the top bearing surface.

30. The method of claim 29, further comprising the step of:

urging the wedge member away from the connection member for unclamping the connection member and wedge member from the frame.

31. The method of claim 30, wherein the step of urging the wedge member away from the connection member comprises the steps of:

providing an removal aperture in the connection member proximal to the first ramped surface proximal to the high portion of the ramped surface of the connection member;

providing a tool with a tubular barrel having an outer surface and an offset pin on the free end thereof;

inserting the pin of the tool into the removal aperture; and rotating the barrel of the tool about the offset pin with the outer surface of the tubular barrel urging the wedge member out of internal clamped communication with the connection member thereby releasing the connection member from the frame member.

* * * * *